No. 631,381. Patented Aug. 22, 1899.
J. PRATT.
TYPE WRITING MACHINE.
(Application filed Feb. 19, 1898.)
(No Model.) 7 Sheets—Sheet 1.

Fig. 1

Witnesses:
Raphaël Netter
C. Holloway

Inventor
John Pratt

No. 631,381. Patented Aug. 22, 1899.
J. PRATT.
TYPE WRITING MACHINE.
(Application filed Feb. 19, 1898.)
(No Model.) 7 Sheets—Sheet 2.

Witnesses:
Raphaël Netter
C. Holloway

Inventor
John Pratt

No. 631,381. Patented Aug. 22, 1899.
J. PRATT.
TYPE WRITING MACHINE.
(Application filed Feb. 19, 1898.)
(No Model.) 7 Sheets—Sheet 6.

Witnesses:
Raphaël Netter
C. Holloway

Inventor
John Pratt

No. 631,381. Patented Aug. 22, 1899.
J. PRATT.
TYPE WRITING MACHINE.
(Application filed Feb. 19, 1898.)

(No Model.) 7 Sheets—Sheet 7.

WITNESSES:
C. Holloway
JEM Bowen

INVENTOR
John Pratt

UNITED STATES PATENT OFFICE.

JOHN PRATT, OF NEW YORK, N. Y., ASSIGNOR TO THE HAMMOND TYPE WRITER COMPANY, OF SAME PLACE.

TYPE-WRITING MACHINE.

SPECIFICATION forming part of Letters Patent No. 631,381, dated August 22, 1899.

Application filed February 19, 1898. Serial No. 670,946. (No model.)

*To all whom it may concern:*

Be it known that I, JOHN PRATT, a citizen of the United States, and a resident of the city of New York, borough of Brooklyn, Kings county, State of New York, have invented certain new and useful Improvements in Type-Writing Machines, of which the following is a specification.

My invention relates to type-writing machines; and my present improvements consist generally in means whereby the type-carrier may be moved along the line of impression and also across the same by action of the key-levers, in the special form of such carrier and its support, in means whereby the paper-carriage may be moved at right angles to the line of print as well as along said line, and in means whereby the type-carrier may be moved across the line of print in both directions from its normal position.

My improvements also consist in certain other features and details of construction, as more particularly hereinafter described.

In the accompanying drawings.

Similar characters represent like parts in all the figures.

A is the base or table of the machine, on which is supported the framework B for sustaining the operating mechanism.

C and C' are the key-levers, extending from the front of the machine to and near its back, the levers C alternating with and of greater length than the levers C', for a purpose hereinafter to be described. The key-levers C C' extend upward at right angles at their front ends, where they are provided with keys $a$, the heights of said upward extensions being such as to form graded banks or rows of keys, the inner row being the highest and the outer or extreme front row being the lowest. This feature is old. In order that the rear arms of all of the levers C and C' may have the same vertical play in a line at right angles with said rear arms, the difference in the length of the arms on both sides of their fulcra is compensated for by making the fulcra of those levers which have the shortest front or key arms and the longest rear or operating arms the highest, grading the fulcra of the levers downward to those having the longest operating or rear arms. The manner of grading the heights of said fulcra is accomplished by making the key-levers at their fulcra-points bent upward like an inverted V, the levers of the innermost or highest bank of keys C' having the highest fulcra $b$, the levers of the next outer and lower keys C having the next highest fulcra $b'$, the levers of the next outer and lower keys C' having the next highest fulcra $b^2$, and the levers of the outermost and lowest bank of keys having the lowest fulcra $b^3$.

Figure 3:
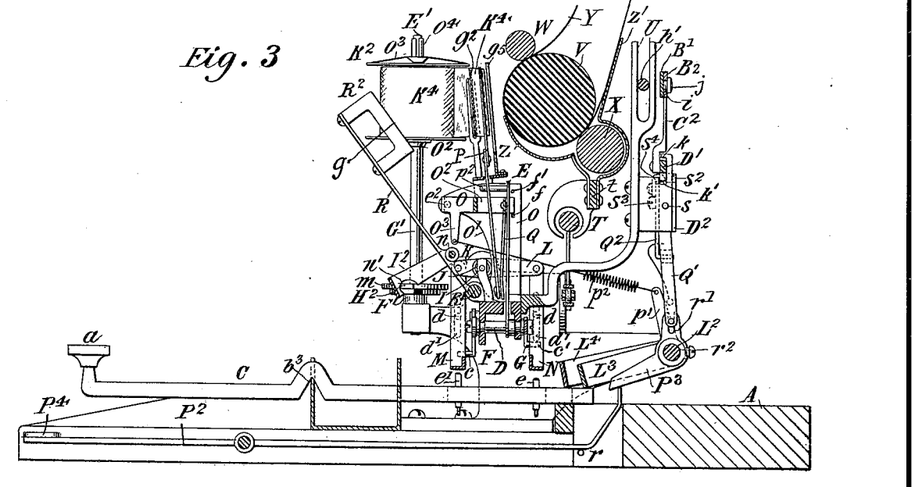
Fig. 3 is a fore-and-aft section through the lines 3 3 of Figs. 1 and 2.
Figure 4:
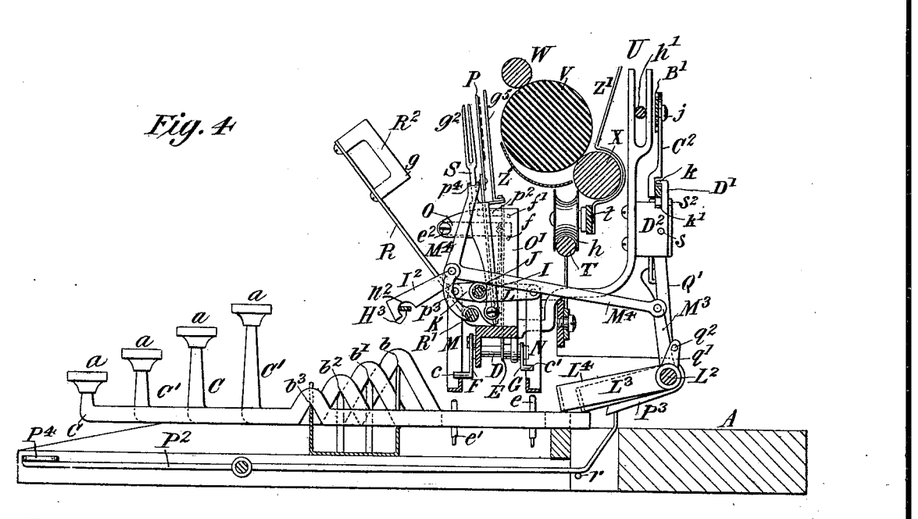
Fig. 4 is a similar section through the lines 4 4 of Figs. 1 and 2.
Figure 7:
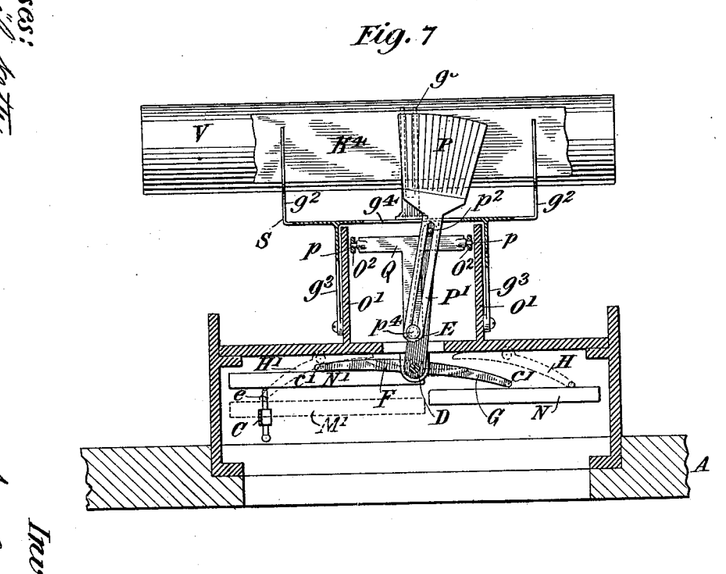
Fig. 7 is a detached view, partly in section, showing the type-carrier, the mechanism for giving it its vertical and radial or curved motion, the ribbon-carrier, and a portion of the ribbon and platen.
Figure 8:
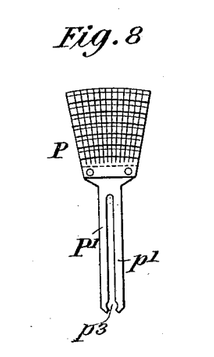
Fig. 8 is a detail view of the type-carrier.
Figure 9:
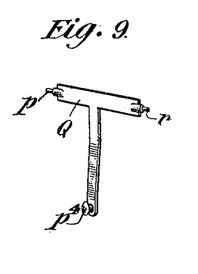
Fig. 9 is a similar view of the type-carrier lifter.
Figures 11, 12, 13, 14, 15, 16:
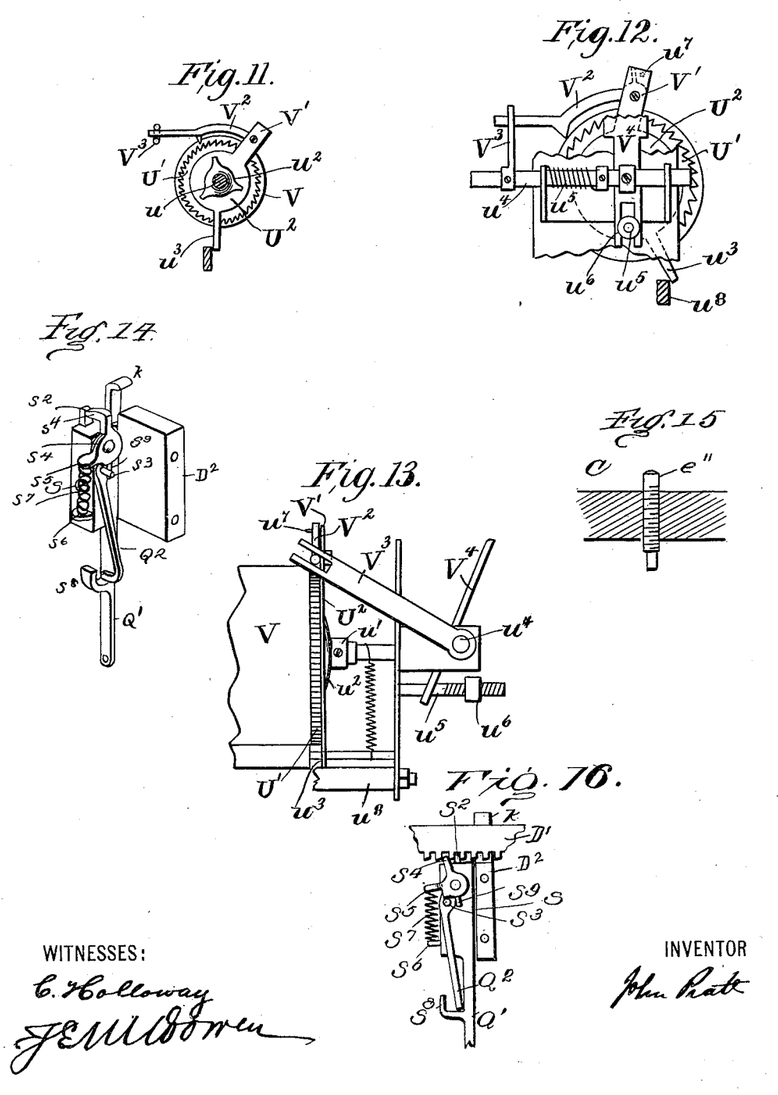
Figs. 11, 12, and 13 are details of the line-feed mechanism.
Fig. 14 is a perspective view of devices for controlling the feed of the paper-carriage.
Fig. 15 is a partial sectional view showing an adjustable screw-pin in a key-lever.
Fig 16 is an enlarged side view showing the rack-feeding pawls and devices.

The following is the printing or writing mechanism: D is a short rock-shaft supported in bearings in a portion of the frame B above the rear arms of the key-levers, about midway of and extending parallel with said levers. Secured to the shaft D and extending upward from the same is an arm E and secured to the front and rear ends, respectively, of the shaft D are cross-arms F and G, each of said arms being provided with outwardly-extending fingers $c\ c'$ at their ends and the arm G being much longer than the arm F. H and H' are two levers pivoted so that their inner arms extend over the fingers $c$ of the two arms, respectively, of the lever F, whereby said lever F may be operated. I I' are two rock-shafts journaled, respectively, in two vertical standards near the center of the machine and in the two side standards B outside of the key-levers, and J J' are two loose sleeves surrounding said shafts. K K K' K' are arms fixed to and extending forward from the shafts I and I', and L L' are arms fixed to and extending backward from the sleeves J J'. M M' are vertically-suspended frames hanging loosely from the free ends of the arms K and K', respectively, and N N' are similar frames loosely hung from the back ends of the arms L L'. Extending inward from the standards B B are pins $d$, which enter vertical slots $d'$ in the frames M and N to guide the movements of said frames vertically. The frames M M' and N N' are adapted to be raised (the arms K K' and L L' rocking on the shafts I I' and sleeves J J') by pins $e\ e'$ in the key-levers C C' when said levers are raised. The pins $e$ in the long key-levers C are directly under the frames N N' and are adapted to raise said frames, and the pins $e'$ in the short levers C' are directly under the frames M M' and are adapted to raise said frames. The degree to which said levers may be raised is determined by the distance between the top of said pins $e$ or $e'$ and the frame on which they act. The pins in levers C C' instead of being plain pins may be in the form of screws and therefore adjustable, as shown in Fig. 15 at $e''$. The outer arms of the rock-levers H H' are adapted to be raised by the lower cross-bar of the frames M M', and when so raised the inner arms of said levers come in contact with the pins $c$ of the rock-bar F, the bar H when raised by the frame M lowering the right arm of lever F and rocking the shaft D to the right and the bar H' when raised by the frame M' lowering the left arm of lever F and rocking the shaft D to the left. O is a lever-frame journaled over the key-levers and in front of the paper-carriage in horizontal bearings in the vertical standards O' at $e^2$. The two rearwardly-extending parallel arms $O^2$ of the frame O pass between pins $f\ f'$ in the standards O' and limit the play of said frame, (see Figs. 3 and 4,) the arms $O^2$ normally resting on the pins $f$. The lever O is provided, from a point near its fulcrum, with a downwardly-extending arm $O^3$, said arm, with the two arms $O^2$, constituting a bell-crank lever. P is the type-plate, formed of a series of radial fingers, preferably thirteen, united toward their common center and held securely on the top of a vertical carrier-plate P'. The fingers of the type-plate I have shown united in the form of a sector of a disk, the fingers of said plate being formed by slitting said sector radially from its upper arc, but not quite through its lower end, (see Figs. 7 and 8,) and I make said plate of celluloid or of similar moldable material with a radial row of type molded on the rear surface of each of said fingers. Such type are arranged in three couplets of two arched rows each, the first two upper and outer rows constituting the upper couplet being comprised of upper-case type or capitals, the next two rows constituting the middle couplet being comprised of lower-case type or small letters, and the lowest two rows and lowest couplet comprising type of numerals, punctuation-marks, &c. Q is a T-shaped lifter for the type-carrier, the outer ends of its cross-bar being provided with pins $p$, which enter holes near the rear of the two arms $O^2$ of the lever-frame O and on which pins said arms can freely turn. (See Fig. 7.) The vertical type-plate carrier P' is provided with a longitudinal slot $p'$, in which enters a lateral pin $p^2$ near the upper end of the oscillating arm E. The lower end of the slot $p'$ is enlarged to a circular opening $p^3$, which encircles a lateral pin $p^4$ on the vertical arm of the lifter Q. The pin $p^4$ forms a center on which the carrier-plate P' and the type-plate P may oscillate.

Figure 1:
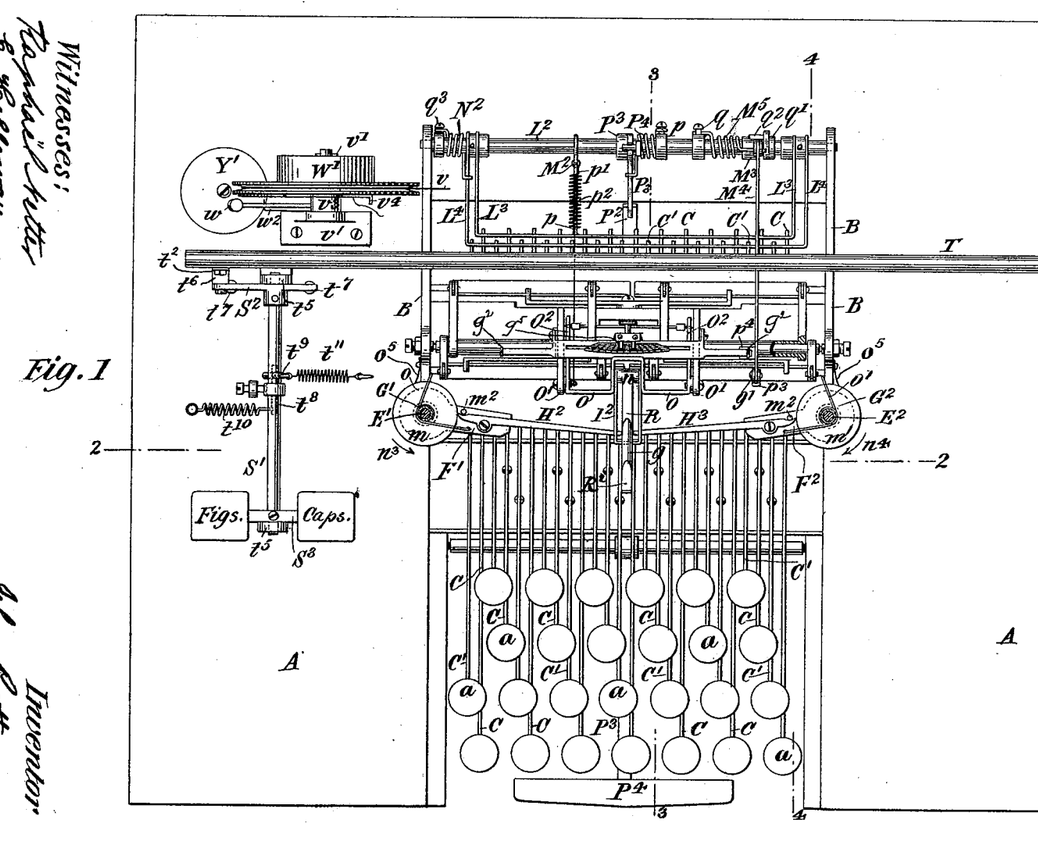
Figure 1 illustrates a plan view of my improved type-writing machine, but with the paper-carriage and carriage-feed removed.

The following is the hammer or type-striking mechanism: R is the hammer-shank, secured to a horizontal rock-shaft R' below and in front of the type-plate P, and $R^2$ is the hammer, having its striking-face $g$ of a length to cover each vertical row of type on the plate P and with its shank and shaft so situated that said hammer-face $g$ when swung forward will strike evenly the front untyped surface of the plate P. The hammer-face $g$ is made long enough to cover all the type on one strip or finger of the type-plate, so that any type on said strip may be struck against the platen when the adjacent surface of said platen is brought nearest to a certain type. The shaft R' is provided with a lateral arm $g'$, (see Fig. 1,) by which said shaft is rocked and the hammer oscillated to strike the type-plate.

*The ribbon-carrier.*—S is the ribbon-guide, formed of two upwardly-extending parallel forks $g^2$, connected by a cross-bar and two parallel downwardly-extending arms $g^3$, loosely journaled to the uprights O'. (See Fig. 7.) The cross-bar of the guide S is provided with a vertical slot $g^4$, through which the type-carrier P' passes and is allowed to oscillate. The forks $g^2$ are situated in a plane in front of the type-plate P (see Figs. 3 and 4) to enable the ribbon to be stretched around the type on the back of the plate P and between the prongs of both forks. Extending upward from the center of the cross-bar of the guide S and back of the type-plate P is a slotted arm $g^5$, Figs. 3, 4, and 7, said slot forming a guide through which a finger of the type-plate P is struck with the hammer.

*Carriage-support and carriage.*—T is the long horizontal rail on which the rollers $h$ of the paper-carriage rest and ride. These rollers $h$ are journaled on a horizontal plate $t$, supporting two vertical end plates T' T'. U is a fixed vertical fork on the machine-frame and between the prongs of which passes the guide-rod $h'$ of the paper-carriage, said fork and rod guiding the carriage in its longitudinal movement. The end plates T' and the longitudinal bar $t$ and rod $h'$ constitute the frame of the paper-carriage. V is the rotary cylindrical platen, journaled in the end plates T' T' and situated back of and near to the type-guide $g^5$. W and X are the frictional rollers, engaging with the platen V and between which rollers and the platen the paper Y is adapted to be fed to and from the platen, respectively. Z and Z' are the feed-scroll and final guide for the paper, situated, respectively, under and back of the platen V. Said platen and the type-plate P should be so situated relatively to each other that the third row of type or the upper row of the second couplet or "lower case" should meet tangentially the platen V when struck upon it by the hammer and when the type-plate and platen are in their normal vertical positions and with the arms $O^2$ of the frame-lever O resting on the pins $f$.

Figure 5:
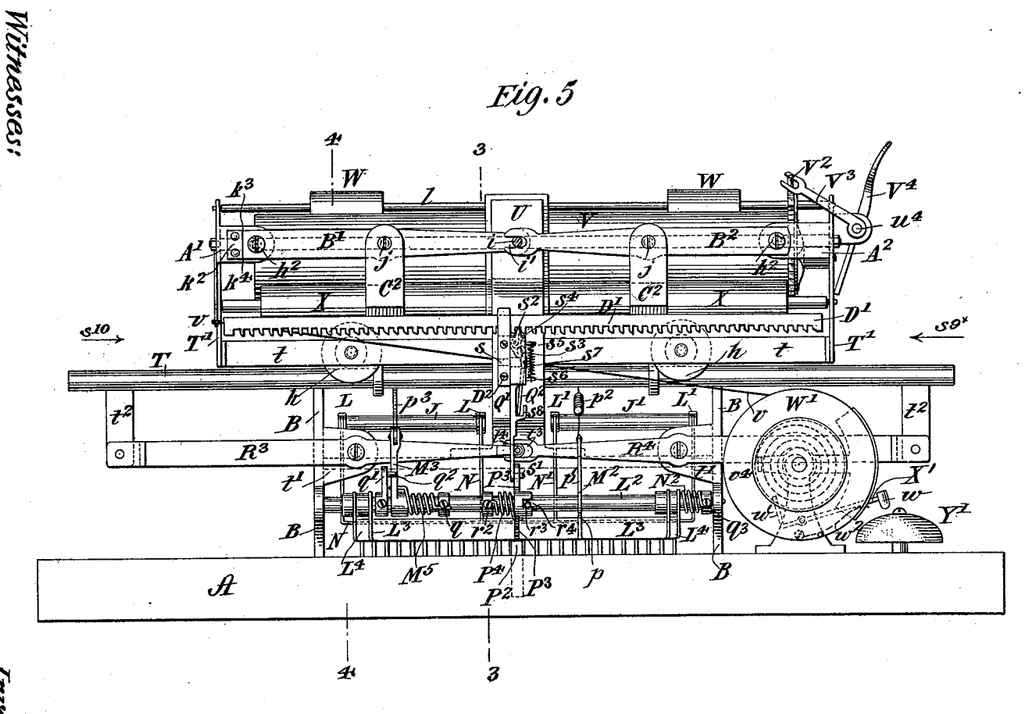
Fig. 5 is a rear elevation of the machine.
Figure 6:
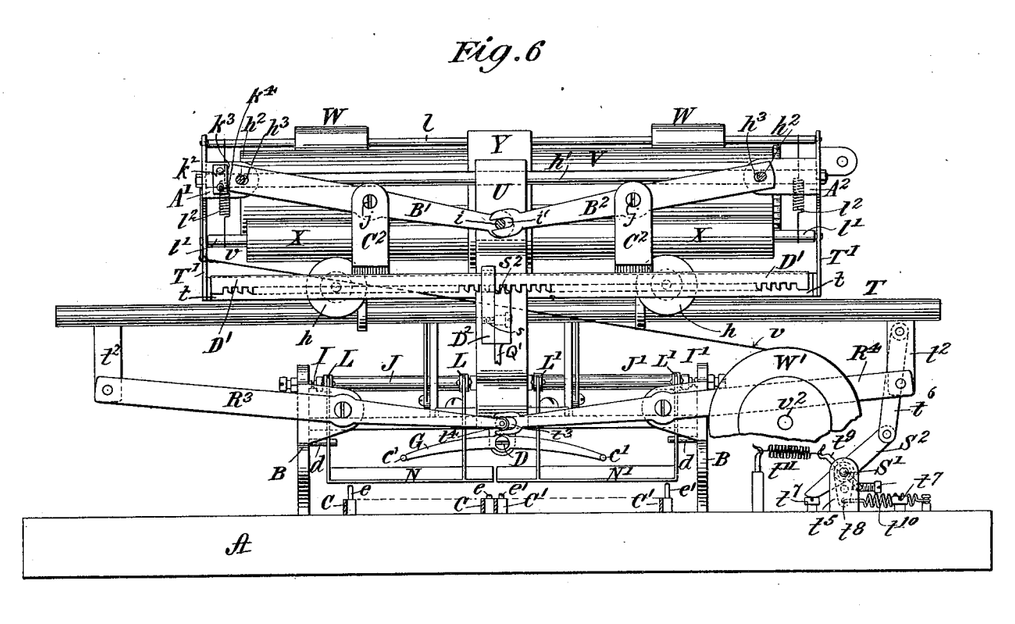
Fig 6 is a similar view, but with the rear rock-shaft and its connecting parts removed and some of the other parts broken away to more clearly show the mechanism for giving the carriage its vertical movement.

*Paper-carriage and feed-rack.*—A' $A^2$ are two brackets extending inward from the two ends T' of the carriage-frame and back of the platen V and forked guide U. To these brackets A' $A^2$ are pivoted near their outer ends two levers B' $B^2$ by screw-pins $h^2$ in the brackets passing through elongated holes or slots $h^3$ in said arms. The arm B' is provided near its inner end with a lateral pin $i$, which engages with a fork or yoke $i'$ in the inner end of the arm $B^2$. About half-way between the ends of each of the arms B' and $B^2$ is pivoted at $j$ a downwardly-extending arm $C^2$, and secured to the lower ends of said arms $C^2$ and at right angles to the same is the carriage feed-rack D'. Extending backwardly from the lower portion of the vertical fork U is a bracket $D^2$, having an upward extension with an inward flange $k$ on its upper end. The top of the bracket $D^2$ is provided with a groove $k'$ immediately under and parallel with the flange $k$ on the extension of the bracket. The rack D' passes under the flange $k$ and into the groove $k'$ and is guided in the same and kept from vertical movement by the flange $k$. The rack D' is thus permitted longitudinal movement only and is always in engagement with its operating mechanism. The carriage, with the platen, however, is permitted to have a vertical movement while the rack is stationary by reason of the levers B' $B^2$ and the vertical arms $C^2$, the pivots $j$ on said arms constituting fixed fulcra on which the equalizing-levers B' $B^2$ operate, and the pins $h^2$, slots $h^3$, and pin $i$ and fork $i'$ permitting the vertical movement of the carriage in spite of said levers rocking in arcs. In the practical operation of the machine the tension-spring is pulling the carriage in the direction from the bracket A' to the bracket $A^2$, and such pull would move said carriage in said direction and out of its proper position relatively with the rack D' if it were not for some compensating mechanism. This mechanism consists of an extension or block $k^2$ on the outer surface of the bracket A', having a straight vertical inner edge $k^3$, forming a shoulder, and the adjacent end $k^4$ of the lever B' being also straight and vertical and in close contact with said edge $k^3$ when the carriage and levers B' $B^2$ are in their normal positions, as shown in Fig. 5. When the carriage is raised, as shown in Fig. 6, the outer end of the arm B' will move upward in an arc, the lower corner of its outer end moving outward against the edge or shoulder $k^3$ of the block $k^2$ and pushing said block and the carriage in direction the reverse of the letter-to-letter feed, fully compensating for the pull on the carriage by the tension-spring in the opposite direction. The shafts $l\ l'$ of the friction-rollers W and X are journaled in slots (not shown) in the end plates of the carriage-frame T', and said rollers are drawn toward each other and are kept in frictional contact with the platen V by coil tension-springs $l^2$, connecting said shafts $l$ and $l'$, respectively. (See Fig. 6.)

Figures 2, 10:
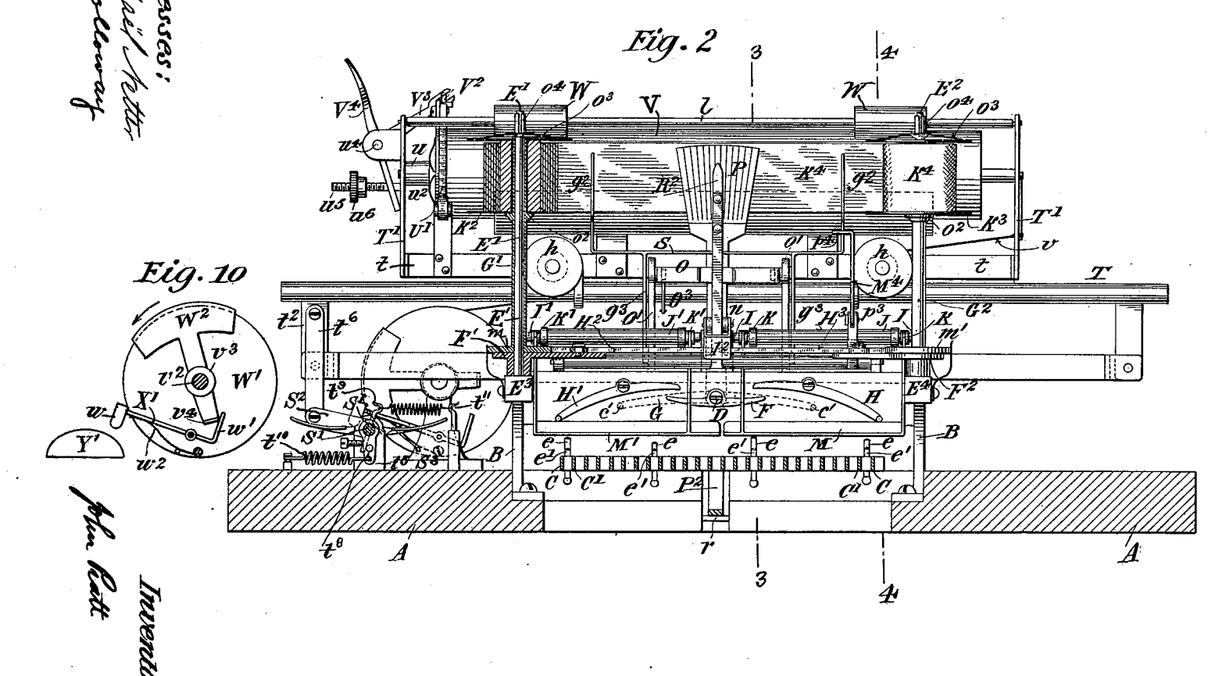
Fig. 2 is a front elevation of the entire machine, except that the key-levers are shown in transverse section in the line 2 2 of Fig. 1 and the left-hand ribbon-spool, sleeve-shaft, and clutch mechanism are shown in vertical section.
Fig. 10 is a similar view of the drum and alarm-bell.

*The ribbon-feed.*—E' $E^2$ are two vertical stationary spindles supported in brackets $E^3$ $E^4$ on a line in front of the ribbon-guide S. F' $F^2$ are two levers resting upon the brackets $E^3$ $E^4$, their respective fulcra being the two spindles E' $E^2$, which pass freely through said levers and on which they freely rock. G' $G^2$ are sleeves loosely surrounding the spindles E' $E^2$, respectively, and provided at their lower ends with disks $m$ $m'$, which rest upon the levers F' $F^2$. $H^2$ $H^3$ are lever-clutches pivoted, respectively, to the inner arms of the levers F' $F^2$, the ends of the outer arms of said clutches engaging with the disks $m$ and $m'$, respectively, and $m^2$ are pins extending upward from the levers F' $F^2$ back of the outer arms of the clutches $H^2$ $H^3$ to limit the movements of said arms in a backward direction relatively to their supporting-levers F' $F^2$. $I^2$ is a rectangular frame loosely pivoted near one end at $n$, Figs. 1, 2, and 3, to the hammer-shank R, and the two parallel forwardly-extending sides of the frame $I^2$ being recessed or notched at $n'$ $n^2$, Figs. 3 and 4, and said two notches engaging with the inner arms of the clutches $H^2$ $H^3$, respectively, with the said parallel arms resting upon said clutches. The striking movement of the hammer-shank R will thus move the long inner arms of the clutches $H^2$ $H^3$ and cause said clutches to rotate the disks $m$ and $m'$ and their supporting-sleeves G' $G^2$ in opposite directions and as shown by the arrows $n^3$ $n^4$, Fig. 1. Tension-springs $o$ $o'$, secured at both ends, respectively, to the machine-frame and the levers F' $F^2$ return said levers and the clutches $H^2$ $H^3$ to their normal positions without revolving the disks and their sleeves. $K^2$ $K^3$ are the two spools upon which the ribbon $K^4$ is wound. These spools loosely surround the sleeves G'

$G^2$, respectively, and rest upon flanges $o^2$ on said sleeves. Spring or other friction washers $o^3$ rest upon the tops of the spools $K^2 K^3$, and nuts $o^4$ on the upper ends of the spindles $E' E^2$ are adapted to bear said washers down on the spools, so as to bind them against the flanges $o^2$. When so bound, the spools will revolve with said flanges and the sleeves bearing the same, but when the washers are loosened by their nuts the sleeves $G' G^2$ are free to revolve independently of the spools. When one spool is tightened on its sleeve, the other should be loosened, so that the ribbon may be wound from the loosened spool onto the tightened one, and in this case both spools will travel in the same direction, while the sleeve of the loosened spool will travel in the opposite direction. The ribbon between the spools in its practical working position is through the guide-forks $g^2$ and between the type-plate P and guide $g^5$. (See Figs. 2, 3, and 7.) The disks $m\ m'$ and their spindles $E' E^2$ are prevented from slipping and rotating in the reverse direction from the arrows $n^3\ n^4$, Fig. 1, by means of spring-detents $o^5$, secured to the sides B of the frame and having their free ends bearing upon the peripheries of the disks $m\ m'$ in a slightly-outward direction.

*Mechanism for operating the hammer, raising the type-carrier, and giving the letter-spacing.*—$L^2$ is a horizontal rock-shaft journaled loosely at the rear of the machine in the standards B B. $L^3$ is a rectangular frame having its two parallel arms loosely journaled on the shaft $L^2$ and the front cross-bar of said frame resting on the longer key-levers C back of the shorter key-levers C'. $L^4$ is a similar frame to $L^3$, with its parallel arms fixed to the shaft $L^2$ and its front cross-bar resting on all of the character-key levers C and C' in front of the cross-bar of the frame $L^3$. $M^2$ is an angle or bell-crank lever loosely journaled on the shaft $L^2$, with its laterally-extending arm $p$ secured to or forming part of the cross-bar of the frame $L^3$ and its upwardly-extending arm $p'$ connected by a coil-spring attachment $p^2$ with the downwardly-extending arm $O^3$ of the rock-frame O. (See Fig. 3.) $M^3$ is an upwardly-extending arm loosely journaled upon the shaft $L^2$. $M^4$ is an angular bar pivoted at its apex to an arm $p^3$, extending upward from the hammer-shaft R'. (See Figs. 1, 2, and 3.) The front arm of the bar $M^4$ is provided with a laterally-extending fork $p^4$, (Figs. 1, 2, and 4,) which engages with one of the uprights of the ribbon-fork $g^2$. The outer end of the bar $M^4$ is pivoted to the arm $M^3$. The movement of the arm $M^3$ in either direction, backward or forward, will correspondingly and in unison move the hammer $R^2$, the ribbon-fork $g^2$, and feed the ribbon through the instrumentality of the frame $I^2$ and clutches $H^2 H^3$. $M^5$ is a coil-spring surrounding the shaft $L^2$, one end of which is secured to a nut $q$, adjustably fixed on said shaft, and the other end of which bears outwardly upon the front edge of arm $M^3$, Figs. 1 and 5. An arm $q'$, adjustably secured to the shaft $L^2$ and provided with a lateral pin $q^2$ in contact with the outer edge of the arm $M^3$ when it and the shaft $L^2$ are in their normal positions, serves to return said arm and connecting parts to their normal positions when the shaft $L^2$ is so turned. $N^2$ is a coil tension-spring encircling the shaft $L^2$, one end of which is secured to a nut $q^3$, adjustably fixed on said shaft, and the other end of said spring $N^2$ bearing on the upper edge of one of the parallel arms of the frame $L^4$, tending constantly to bear the cross-bar of said frame down on the key-levers C C'. $P^2$ is the spacer-lever, extending under the levers C C' and parallel with the same and extended upward at its rear end back of the levers C C'. A stop $r$, on which the rear arm of the lever $P^2$ rests, forms a limit for the downward movement of said arm. $P^3$ is a bell-crank lever, having a collar at its apex which loosely surrounds the shaft $L^2$, which forms the fulcrum for said lever. The forwardly-extending arm of said lever rests upon the rear arm of the space-key lever $P^2$. The upwardly-extending arm of the lever $P^3$ is provided with a slot or slit $r'$, for a purpose hereinafter to be described. A coil tension-spring $P^4$ surrounds the shaft $L^2$, one end of which is secured to an adjustable nut $r^2$ on said shaft and the other end bears down upon the forwardly-extending arm of the lever $P^3$, forcing said arm constantly down upon the spacer-lever $P^2$. A lateral pin $r^3$ on the shaft $L^2$ engages with a notch or recess $r^4$ in the collar of the lever $P^3$, the width of such notch being sufficient to allow of a slight play of the pin $r^3$ in said notch and the sides of the same limiting said play. Q' is a lever pivoted to the side of the bracket $D^2$ at the rear of the machine at $s$. A lateral pin $s'$ on the lower arm of said lever engages with the slot $r'$, and a dog or nib $s^2$ on the end of the upper arm of said lever engages with the rack D'. A second lever $Q^2$ is pivoted on the front of lever Q' at $s^3$, Figs. 5, 14, and 16, and on the front of this lever $Q^2$ is pivoted a small lever-dog $s^4$, the nib of which engages with the rack D' when the dog $s^2$ is disengaged therefrom, the opposite arm $s^5$ of said lever-dog $s^4$ being connected with a pin $s^6$ on the bracket $D^2$ by a coil expansion-spring $s^7$. The end of the lower arm of lever $Q^2$ enters a yoke $s^8$ on the side of lever Q' and has lateral play in said yoke, the two sides of the same constituting the limit of said play. The dog $s^4$ is normally in engagement with the rack D', and the backward and forward movements of the upper arm of lever Q' by the lever $P^3$ cause the dogs $s^2$ and $s^4$ to engage with and disengage from said rack. The yoke $s^8$ on lever Q' allows lateral play of the lever $Q^2$ and a turning down of the pivoted dog $s^4$ to permit the rack D' to ride over said dog by pushing the carriage in the direction of the arrow $s^{9\times}$. During the forward feeding of the carriage the lever $Q^2$ remains at rest in the position shown and only swings across yoke $s^8$ when the carriage is forced backward, as above indicated. Such movement lowers the pivot of dog $s^4$ sufficiently to allow the rack D' to slide over said dog. As shown in Fig. 5, lever $Q^2$ at its upper end is deflected to the left—that is, it is an angle-lever with its pivot at the angle. The dog $s^4$ has its pivot in said deflected end of lever $Q^2$ in such relation thereto that it is slightly lowered by movement of the lever on its pivot to allow backward movement of the rack, as above described. The pivot $s^3$ of arm $Q^2$ is extended, as shown in Fig. 14, and pawl or dog $s^4$ is limited in its throw thereby. Fig. 14 shows said dog in the position which it occupies when out of engagement with the rack. Spring $s^7$ has expanded, throwing the upper end into alinement with tooth $s^2$, the dog being stopped in this position by the pin or projection $s^9$ thereon striking pin $s^3$, as in Fig. 14, in position to engage the next notch of the rack when lever Q' is again moved on its pivot. Pins $s^3$ and $s^9$ thus prevent the dog moving too far under the influence of spring $s^7$ when the dog leaves the rack and is free to move under the influence of said spring. Referring now to Fig. 16, the dog $s^4$ is shown in the position which it occupies when it is in engagement with the rack. The tension of the carriage-feeding spring has compressed spring $s^7$, turning dog $s^4$ to the left until it is stopped by pin $s^3$, as clearly shown. The carriage thus feeds one space and is held by dog $s^4$ until lever Q' is again moved. When the carriage is forced in the reverse direction against the tension of its feed-spring—i. e., toward the right in Fig. 16—dog $s^4$ turns on its pivot until $s^9$ strikes $s^3$. Further movement causes lever $Q^2$ to swing across yoke $s^8$, lowering the dog $s^4$ sufficiently to allow the rack to slip by. The depression of the space-key $P^4$ causes its lever $P^2$ to rock the lever $P^3$ backward and rock the upper arm of lever Q' forward, disengaging $s^4$ from the rack D' and engaging dog $s^2$ with the same, the brief time between the engagements of said two dogs with the rack permitting the rack and carriage to feed longitudinally in the direction of the arrow $s^{10}$, Fig. 5, one tooth of the rack or one letter-space. It should be noted that the above-stated action does not rotate the shaft $L^2$, as the lever $P^3$ is loosely journaled on the same. The spring $P^4$ returns the parts to their normal positions, as above described. If one of the short key-levers C' be operated, the frame $L^4$ will be raised and turn the shaft $L^2$ backward, (the frame $L^3$ and lever $M^2$ remaining stationary, as they are loosely joined on shaft $L^2$,) and said movement of the shaft $L^2$ will, through pin $r^3$ in slot $r^4$ of lever $P^3$, move said lever and the dogs $s^2$ $s^4$ and feed the carriage the space of one tooth, and the same rotary movement of the shaft $L^2$ will cause the spring $M^5$ to push yieldingly backwardly the arm $M^3$ and through the arm $M^4$ draw backward the ribbon-forks $g^3$, with the ribbon, and also draw forward the hammer $R^2$, giving a yielding blow against the ribbon and type-plate P and also through the frame $I^2$ and clutches $H^2$ $H^3$ feed the ribbon, the striking of the hammer $R^2$ against the ribbon taking place immediately after the feeding of the carriage and ribbon and the drawing backward of the ribbon guide-fork. The free end of the spring $M^5$, acting directly upon the arm $M^3$, causes said spring to positively contact against its normal condition, and the pressure exerted by it on the arm $M^3$ is a pressure against the more or less yielding resistance of the spring, which yields the more in proportion to the suddenness of the stroke. The resistance of the spring $M^5$ is regulated by the adjustable nut or collar $q$.

*General operation.*—When any one of the longer levers C is operated, both frames $L^3$ and $L^4$ are raised. The raising of the outer lever $L^4$ causes the operations above described, and in addition to said operations the raising of the loosely-hanging frame $L^3$ turns back the lever $M^2$ and, through its arms $p'$ and spring $p^2$, raises the back end of the frame O $O^2$, the lifter Q, and type-plate P the space between two arcs of type and to the next upper arc, said upward movement of the arms $o^2$ being limited by the pins $f'$, as heretofore described. The manner of moving the type-plate P radially or bringing it into position for the hammer to strike the plate opposite the appropriate type has been hereinbefore stated in reference to the action caused by operating one of the short levers C'; but as the levers C extend to the end of the levers C' and beyond them the operation of the levers C will operate all the parts that the shorter levers C' operate. As the lifting of both frames $L^3$ and $L^4$ is accomplished simultaneously by the levers C, the raising of the type-plate will be accomplished at substantially the same time as the lateral movement of the same, and hence only one movement of the key-lever will bring the proper type of any one set in its striking position whichever of the two rows said type is in. It is important, however, to note that when the suspended frame M is raised by one of the levers C and the lever F is rocked to the right through the intermediation of lever H the right arm of lever G is lowered, corresponding with that of F, and comes in contact at the end of the movement of lever F with the frame N, said frame and right arm of lever G constituting a stop for the movement of the arm F. In a similar manner the frame N' and left arm of lever G' act as a stop to the downward movement of the left arm of lever F when it has been so rocked by one of the key-levers C. Also when the lever G has been rocked to the right or left by one of the levers N or N' and by one of the key-levers C' the lever F is rocked correspondingly with the lever G, and by said lever rocking either the lever H or the lever H' one of said levers comes in contact with one of the frames M or M' and forms a stop to the movement of lever G. If the left arm of lever G be raised by the frame N', (see Fig. 7,) the lever F will depress the outer arm of lever H' and cause it to come in contact with the frame M' and be held there, and said levers F and H' will stop the further movement of said lever G, and if the right arm of lever G be raised by the frame N the lever F will depress the outer arm of lever H and cause it to come in contact with the frame M and be held there, and said levers F and H will stop the further movement of said lever G. The above construction and action insure the proper adjustment of the type-plate, so that the proper type will be struck, the lever G acting as a stop-lever while the lever F and levers H H' are lifting-levers and the levers F, H, and H' acting as stop-levers when the lever G is acting as a lifting-lever.

*Means for raising the carriage-support.—* Pivoted to brackets $t'$ $t'$ on the standards B B and under the rail T are two equalizing-levers $R^3$ $R^4$, their outer ends being pivoted to downward extensions $t^2$ $t^2$ from the rail T. The inner end of the arm $R^4$ is provided with a fork $t^3$, in which a roller or pin $t^4$ on the inner end of lever $R^3$ engages. S' is a rock-shaft pivoted in standards $t^5$ at right angles with the rail T. $S^2$ is a cross-arm lever fixed to the shaft S', one arm of said shaft being connected by a connecting-rod $t^6$ with one of the extensions $t^2$. Adjustable screw-stops $t^7$ $t^7$ under the respective arms of the cross-lever $S^2$ serve to limit the downward movements of said arms when so turned by the shaft S'. $S^3$ is a cross-arm lever fixed to the shaft S' near its front end and parallel with the cross-lever $S^2$. The right arm of lever $S^3$ when depressed so that the corresponding arm of lever $S^2$ is stopped by the screw $t^7$ causes the rail T and the paper carriage and platen V, supported thereon, to move in vertical planes by reason of the equalizing-levers $R^3$ $R^4$ B' $B^2$, the rack D' remaining stationary and the carriage moving independently of the same until the uppermost row of type (upper row of "upper case") is tangential with the platen V when struck upon it by the hammer. If one of the longer key-levers C be operated, the type-plate will be raised the distance between two rows, as above described, and the lower row of the upper case of type will be in a position to be struck against the platen V by the hammer. If the left arm of lever $S^2$ be depressed, so that the corresponding arm of lever $S^2$ is stopped by the screw $t^7$, the rail T will be drawn down, the carriage and platen V dropping vertically by reason of the equalizing-levers until the uppermost row of type of numerals (the next to the lowest row) is in a position to be struck by the hammer against the platen. A depression of one of the longer key-levers C will raise the type-plate in a position for the lowest row of type (numbers) to be struck by the hammer. Two short arms $t^8$ $t^9$ on the shaft S' are connected with coil tension-springs $t^{10}$ $t^{11}$, respectively, which extend in opposite directions, the opposite ends of said springs being fixed. The spring $t^{11}$ serves to lighten the weight of the carriage and its supporting-rail T when being lifted and to render the raising of said rail and carriage easier, and the spring $t^{10}$ serves to return the rail and carriage to their normal positions, (see Figs. 1, 2, and 5,) with the type of the "lower case" ready to be acted on by the hammer. As the different sets of type are arranged on the plate in rows placed vertically under each other and the type being adapted to be struck tangentially against the platen by the hammer, it is necessary to have the tangential surface of the platen always opposite the appropriate type when struck by the hammer in order that the impression on the paper may be made. The above results are attained by the means for shifting the type-plate vertically the distance from one row of type to the next, (of the same class of type,) and whenever it is desired to have the tangential line on the platen opposite a type of a different character from the one previously impressed the platen itself is given a vertical movement in one or the other direction the distance between two or more rows, so as to bring the tangential line of platen opposite the appropriate type. The mechanism for accomplishing the above results is hereinbefore described.

The following is the mechanism for feeding the paper from line to line: U' is a ratchet secured to the end of the rotary cylindrical platen V. $U^2$ is a disk loosely journaled on the shaft $u$ and held against the end of the platen V by a nut $u'$ and interposed friction spring-washer $u^2$. The disk $U^2$ is provided with upwardly and downwardly extending arms, respectively, V' and $u^3$. $V^2$ is a pawl hinged to the arm V' above and engaging with the ratchet U'. $V^3$ is an arm fixed to a rock-shaft $u^4$ in the paper-carriage, extending in a direction transversely with the platen V, one end of said arm being forked and engaging with the free end of the pawl $V^2$, and $u^5$ is a coil tension-spring surrounding the shaft $u^4$ and tending to raise the arm $V^3$ and normally keep the dog $V^2$ out of engagement with the ratchet U'. $V^4$ is a cross-arm fixed to shaft $u^4$ with its upper arm extending outwardly from the paper-carriage and its lower arm forked and yoking an outwardly-extending screw-rod $u^5$, an adjustable nut $u^6$ on said rod serving to limit the outward movement of the lower arm of the cross-bar $V^4$ and the consequent downward movement of the arm $V^3$, pawl $V^2$, and the rotary movement of the ratchet and platen. A pin $u^7$ on arm V' above the pawl $V^2$ limits its upward movement. The lower arm $u^3$ of the disk $U^2$ coming in contact with a bar $u^8$ limits the backward movement of the arm V' and pawl $V^2$. The forked arm $V^3$, shaft $u^4$, and cross-bar $V^4$ constitute a bell-crank lever, the pressure of the bar $V^4$ toward the end of the platen forcing down the forked arm $V^3$ and causing the pawl V² to engage with the ratchet U' and rotate the same. When the pressure on the bar V⁴ is removed, the spring $u^5$ will return the bell-crank lever to its normal position and raise the pawl V² out of engagement with the ratchet, as shown in Fig. 12. The line-to-line feed of the paper by rotating the ratchet U' is accomplished by pressing the bar V⁴, as above stated, in pushing back the carriage to begin a new line of printing, and the pawl V² is brought into engagement with the ratchet U' because the friction of the disk U² against the spring-washer $u^2$ is greater than the friction of the pawl in its bearing. The cylindrical platen V is thus rotated a distance which is determined by the adjustment of the nut $u^6$.

*Alarm mechanism.*—W' is the usual spring-drum for winding up the cord $v$, which draws the paper-carriage back on its longitudinal feed, drawing its rack D' against the dogs $s^2 s^4$. This drum W' is journaled back of the rail T and to the left of the left standard B in vertical standards $v' v'$, and the outer end of the cord $v$ is secured to the right end plate T' of the paper-carriage. W² is a cross-bar loosely journaled on the shaft $v^2$ of the drum W' and kept in frictional contact with the same by means of a sleeve $v^3$, interposed between said arm and the front journal-bearing $v$ of the drum. One arm of the bar W² is provided with a forward extension $v^4$, and the opposite arm of said bar extends a little beyond the periphery of the drum W' in order that it may be easily turned by hand. X' is the bell-hammer lever, pivoted to the casing of the drum W', having the hammer $w$ on one arm and its opposite arm having an upward extension $w'$, against which the extension $v^4$ of the cross-bar W² is adapted to engage. The bell Y' is situated under the hammer $w$, and a spring $w^2$, bearing on the under side of hammer-lever X', tends to keep said hammer out of contact with the bell. The revolution of the drum W' in drawing the paper-carriage to the left causes the arm W² to correspondingly revolve until the projection $v^4$ on said arm strikes the extension $w'$ on the hammer-lever X', raising the hammer $w$ and said extension $w'$ as soon as released from projection $v^4$, allowing the hammer $w$ to fall and strike the bell Y'. The cross-bar W² can so be turned by hand that the projection $v^4$ may be made to strike the extension $w'$ of the hammer-lever and also to ring the bell at any point in the longitudinal movement of the paper-carriage.

What I claim as new, and desire to secure by Letters Patent, is—

1. In a type-writer, the combination of the platen, a type-plate having the type on its plane surface nearest the platen, mechanism for imparting to said plate a movement across the line of print, mechanism for giving said plate a lateral movement in the same plane along said line, and mechanism for giving the platen a movement across said line.

2. In a type-writer, the combination of the platen, a type-carrier, mechanism for imparting to said carrier a movement across the line of print, and mechanism for giving the carrier a movement along said line substantially simultaneous with its other movement, and mechanism for giving the platen a movement across said line.

3. In a type-writer, the combination of a laterally-movable type-plate, rocking arms extending in opposite directions and in a plane or planes parallel with the line of movement of said plate and connected with the type-plate for moving it laterally in both directions, transverse bars extending respectively over each set of key-levers and adapted to be raised by the same, and by such action of each bar, raise respectively the arm above it and move the type-plate to the right or left, all as set forth.

4. In combination with a sectoral type-plate pivoted upon its center, rocking arms extending in opposite directions and connected with the type-plate for rocking said plate on its center, of a series of key-levers, transverse bars extending respectively over each set of key-levers and adapted to be raised by the same, and by such action of each bar raise respectively the arm above it and rotate the type-sector to the right or left, all as set forth.

5. In combination with a laterally-movable type-plate capable of movement in either direction, a series of key-levers, rocking driver and stop-arms pivoted above said key-levers, a driver and a stop-arm extending on each side of a vertical plane, the driver and stop-arms on one side of said plane adapted to be raised by one set of key-levers, and the driver and stop-arms on the other side of the plane adapted to be raised by another set of key-levers and the limit of upward play of said arms on one side affected by the stop-arm on the other side of the plane coming in contact with a stop device in its downward movement all as set forth.

6. In combination with a laterally-movable type-plate capable of movement in either direction, a series of key-levers, rocking driver and stop-arms pivoted above said key-levers, a driver and a stop-arm extending on each side of a vertical plane, the driver and stop-arms on the two sides of said plane adapted to be raised respectively by the action of one set of key-levers, while the driver and stop-arms on the opposite side of the plane are depressed, and a bar extending over said key-levers against which one of said arms comes in contact in descending, thus limiting its downward movement and the movement of the type-plate, all as set forth.

7. In combination with a laterally-movable type-plate capable of movement in either direction, a series of key-levers, rocking driver and stop-arms pivoted above said key-levers, a driver and a stop-arm extending on each side of a vertical plane, bars extending across said key-levers, each of which is adapted to be raised by a set of said levers, and the driver and stop-arms on the two sides respectively of the vertical plane adapted to be raised by one or more of said bars, while the driver and stop-arms on the opposite side of said plane are depressed and then stopped by one of said arms coming into contact with one of said bars, and thus limit the movement of the type-plate, all as set forth.

8. In combination with a laterally-movable type-plate, rocking arms extending in opposite directions and in a plane or planes parallel with the line of movement of said plate, and connected with the type-plate for moving it laterally in both directions, a series of key-levers, transverse frames suspended from rocking arms and extending respectively over each set of key-levers, and adapted to be raised by the same, and by such action of the frames, raise respectively the arm above it, and move the type-plate to the right or left, all as set forth.

9. In combination with a laterally-movable type-plate, a series of key-levers, rocking driver and stop-arms pivoted above said key-levers, a driver and a stop-arm extending on each side of a vertical plane, transverse frames suspended from rocking arms and extending respectively over each set of key-levers, the driver and stop-arms on the two sides of said plane adapted to be raised respectively by the action of one set of key-levers, and the frame above them; while the driver and stop-arms on the other side are depressed and come in contact with the frame below them, thus limiting its downward movement, and the movement of the type-plate, all as set forth.

10. In combination with a laterally-movable type-plate, a series of key-levers, rocking driver and stop-arms pivoted above said levers, a driver and a stop-arm extending on each side of a vertical plane, transverse frames suspended from rocking arms and extending respectively over each set of key-levers, and the driver and stop-arms on the two sides respectively of the vertical plane adapted to be raised by one or more of said bars, while the driver and stop-arms on the opposite side of said plane are depressed and stopped by one of said arms coming in contact with one of the frames, and thus limit the movement of the type-plate, all as set forth.

11. In combination with a laterally-movable type-plate, a series of key-levers, a rock-shaft above the key-levers and provided with an upwardly-extending arm engaging with the type-plate carrier, and with other arms extending on opposite sides, and intermediate mechanism between said key-levers and rocking arms whereby one of said arms is raised by the action of one set of key-levers, and the other arm raised by another set to move the type-plate to the right or left, all as set forth.

12. In combination with a laterally-movable type-plate, a series of key-levers, a rock-shaft above the key-levers provided with an upwardly-extending arm engaging with the type-plate carrier, and with driver and stop-arms extending on opposite sides, and intermediate mechanism between said driver and stop-arms and the key-levers, whereby the arms on one side of the shaft are raised and the type-plate moved, and the downward movement of the arms on the opposite side of the shaft are stopped and the movement of the type-plate limited, all as set forth.

13. In combination with a laterally-movable type-plate, a series of key-levers, a rock-shaft above the key-levers provided with an upwardly-extending arm engaging with the type-plate carrier, and with driver and stop-arms extending on opposite sides, bars extending across the key-levers and under said driver and stop-arms, whereby the arms on both sides of the shaft may be raised by the respective set of key-levers and bar, and the type-plate moved, and the downward movement of the arms on the opposite side of the shaft are stopped by meeting the bar under them, and thus limit the movement of the type-plate, all as set forth.

14. In combination with a laterally-movable type-plate, a series of key-levers, a rock-shaft above the key-levers provided with an upwardly-extending arm engaging with the type-plate carrier, and also with two cross-levers each of which extends on both sides of the shaft, two levers having their inner arms respectively overlapping the two arms of one of the cross-levers, bars extending across the key-levers and under the cross and overlapping levers for rocking the same, and indirectly moving the type-plate, and also causing one of the cross or overlapping levers to rock in the opposite direction from the lifted ones, and to come in contact with one of said bars, and thus limit the movement of the type-plate, all as set forth.

15. In combination with a sectoral type-plate pivoted upon its center, a rock-shaft, an upwardly-extending rock-arm secured to said shaft and having a lateral pin engaging with a slot in the type-carrier, a series of key-levers, and intermediate mechanism between said key-levers and rock-shaft, whereby said shaft and its arm are rocked and the type-plate moved radially, all as set forth.

16. In combination, the vertically-movable rock-frame lever, a frame loosely suspended therefrom, and a movable type-plate, attached to said suspended frame, and having lateral movement on the same, all as set forth.

17. In combination, the vertically-movable rock-frame lever, a frame loosely suspended therefrom and a movable type-plate pivoted to said suspended frame, and having a radial movement thereon, all as set forth.

18. In combination, the vertically-movable rock-frame, a frame suspended therefrom, a radially-movable type-plate pivoted to said suspended frame, a radially-movable arm adapted to be operated by the key-levers, and connected with the type-plate for giving radial motion to the same, all as set forth.

19. In combination, the vertically-movable rock-frame, a frame suspended therefrom, a type-plate pivoted to said suspended frame, a radially-movable arm adapted to be operated by the key-levers, and connected with the type-plate by a pin and slot, whereby the movement of said arm will cause the type-plate to move radially, all as set forth.

20. In a type-writer, the combination of a type-plate having type on one side and forming part of the same, and extending in a line from the outer edge of the plate inward, a platen having a movement in a direction from the outer edge of the plate inward, and a hammer having its striking-face extending in the direction of said movement of the platen, and of a length to cover all of said line of type, whereby at any position of the platen, the hammer can strike the proper type against the platen, all as set forth.

21. In a type-writer, the combination of a type-plate having two or more rows of type on one side and forming part of the same, and the letters of said rows situated respectively under those of the rows above them, a platen having a movement at right angles with the line of print, and a hammer having its striking-face extending in the direction of said movement of the platen, and of a length to cover one row of type from the outer edge inward at any position of the platen, whereby the hammer can strike the proper type against the platen, all as set forth.

22. In a type-writer, the combination of two or more type arranged in a row, a movable platen for said type to strike against, a hammer having its striking-face of a length to cover said row of type, and adapted to strike the type against the platen, and said platen having an adjustable movement in the direction of said type-row, for bringing the surface of the platen nearest to each type respectively, all as set forth.

23. In a type-writer, the combination with the oscillating arm of a propelling device, of a lever, a spring bearing or pressing upon the oscillating arm in the direction of its propelling movement and adapted to propel said arm directly, by additional pressure in the same direction when the lever is operated, all as set forth.

24. In a type-writer, the combination with the hammer, of a lever, a coiled spring on the shaft of said lever, and one end secured to said shaft, and the free end of said spring bearing on the operating-arm of the hammer, whereby the operation of the lever will cause the free end of the spring to move the hammer directly, and give a yielding and retarding quality to the blow, all as set forth.

25. In a type-writer, the combination with the platen, of a type-plate having the type arranged on the side nearest the platen, a pivoted frame in front of the platen, and connected with said plate, and having an oscillating movement toward and away from the plate, a bell-crank rock-lever having one arm bearing upon the key-levers, and adapted to be operated by the same, and a link or arm pivoted to the opposite arm of said lever and to said frame respectively, whereby the frame and plate are rocked toward and away from the platen, as set forth.

26. In a type-writer, the combination of a pivoted frame for supporting the ink-ribbon, the type-plate connected with said frame, and with its type arranged on the side nearest the ribbon, a bell-crank lever having one arm bearing upon the key-levers, and adapted to be operated by the same, and a link or arm pivoted to the opposite arm of said lever and to said frame respectively, whereby the ribbon and plate may be rocked back and forth, all as set forth.

27. In a type-writer, the combination of a pivoted frame, for supporting the ink-ribbon, the type-plate connected with said frame by a lateral guide, and having its type arranged on the side nearest the ribbon, a bell-crank lever having one arm bearing upon the key-levers and adapted to be operated by the same, and a link or arm pivoted to the opposite arm of said lever and to said frame respectively, whereby the ribbon and plate may be rocked back and forth, all as set forth.

28. In a type-writer, in combination with the platen, the pivoted frame for supporting and guiding the ink-ribbon, said frame having an oscillating movement backward and forward toward and away from the platen, and also provided with a slotted or bifurcated arm back of the ribbon-supports, but extending in the same direction therewith, all as and for the purposes set forth.

29. In a type-writer, the combination with the platen, of a type-plate having the type arranged on the side nearest the platen, a pivoted frame connected with said plate, a rock-lever adapted to be operated by the key-levers, a link or arm connecting said frame and rock-lever, the hammer having its striking-face in front of the type-plate, and its operating-arm connected with the shaft of the rock-lever, all as set forth.

30. In a type-writer, the combination with the platen, of a type-plate having the type arranged on the side nearest the platen, and connected with a pivoted frame in front of the platen, a rock-lever adapted to operate said frame, and be operated by the key-levers, the hammer having its striking-face in front of the type-plate, a spring secured to the rock-lever and bearing upon the hammer-operating arm, all as and for the purposes set forth.

31. In a type-writer, the combination of the two ribbon-spools, rotatable supports for said spools, and means for binding the spools to their supports, two disks secured respectively to the supports, two clutches, the hammer-arm, and connections between said arm and clutches, whereby the operation of said arm will move the clutches into engagement with the disks and rotate the same, all as set forth.

32. In combination with the paper-carriage, the longitudinal feed-rack provided with two vertical arms, means for preventing vertical movement of said rack, two longitudinal levers fulcrumed on said arms, and connected at their inner ends by a loose joint, whereby they may rise and fall in unison, and the outer ends of the levers pivoted to the carriage, all as and for the purposes set forth.

33. In combination with the paper-carriage, the longitudinal feed-rack provided with two vertical arms, means for preventing vertical movement of said rack, two longitudinal levers fulcrumed on said arms and connected at their inner ends by a loose joint, whereby they may rise and fall in unison, and the outer ends of the levers pivoted to the carriage, the pivoted connection at the outer end of one of said levers having a slight play, and the carriage provided with a shoulder in contact with the outer end of said lever, all as and for the purposes set forth.

34. In combination with the paper-carriage, the longitudinal feed-rack provided with two vertical arms, means for preventing vertical movement of said rack, two longitudinal levers fulcrumed on said arms and connected at their inner ends by a loose joint, whereby they may rise and fall in unison, and the outer ends of the levers pivoted to the carriage, the pivoted connection at the outer end of one of said levers having a slight play, and the carriage provided with a shoulder adjacent to the outer end of said lever, and the propelling mechanism for the carriage-feed drawing said carriage and its shoulder in a direction toward said lever, all as and for the purposes set forth.

35. In combination with the paper-carriage, the support for the same, equalizing-levers for giving said support a vertical movement, the longitudinal feed-rack, means for preventing vertical movement of said rack, and means connecting said rack with the carriage whereby the latter may rise and fall vertically with its support independently of the rack, all as set forth.

36. In a type-writer, the means for raising and lowering the paper-carriage vertically, consisting of a longitudinal rail on which the paper-carriage is supported, two longitudinal arms connected loosely to said bar and also connected loosely together at their inner ends, a rock-lever pivotally connected with said rail, and tension-springs connected with said rock-lever for tending to keep the same and the carriage-support in their normal positions, all as set forth.

37. In a type-writer, the combination of the longitudinal rail for supporting the paper-carriage, two longitudinal arms connected loosely with said rail at or near its outer ends respectively, and connected loosely together at their inner ends, a lever pivotally connected with said rail and the shaft of said lever provided with operating-arms extending on opposite sides of the same, all as set forth.

38. In a type-writer, the combination of the longitudinal rail for supporting the paper-carriage, two longitudinal arms connected loosely with said rail at or near its outer ends respectively, and connected loosely together at their inner ends, a lever pivotally connected with said rail and the shaft of said lever provided with operating-arms extending on opposite sides of the same, and stops for limiting the play of said arms, all as set forth.

39. In a type-writer, the combination of the dog-bearing lever for engaging with the longitudinally-movable feed-rack, a rock-lever loosely journaled on a revoluble shaft, and with one arm of said lever connected with the dog-bearing lever, and its other arm resting on the space-key lever, and the portion of the rock-lever surrounding the shaft connected with the same by a pin and slot, all as and for the purpose set forth.

40. In a type-writer the combination of a rock-shaft, a frame secured thereto, key-levers on which said frame rests, a spacer-lever, a lever operated by the spacer-lever and pivoted on said rock-shaft, a lever Q' moved by said lever pivoted on the rock-shaft, dogs, a rack engaged alternately by said dogs, a paper-carriage to which said rack is connected, a hammer, an arm for operating the hammer, and an arm extending from said rock-shaft and connected to said arm for operating the hammer.

41. In a type-writer the combination of a rock-shaft, a frame fixed thereto and resting on all of the character-key levers, another rock-frame loosely journaled on said shaft and resting on one set of said key-levers, and said frame connected with a vertically-movable support for the type-plate, and the spacer rock-lever and operating-arm of the hammer attached to said shaft, whereby the raising of the key-levers which extend under both rock-frames may rock said frames, and operate the type-lifter, spacer-lever and hammer, all as set forth.

42. In combination with the paper-carriage and longitudinal feed-rack attached to the same, a lever Q' having a rigid dog at one end and pivoted to swing in a plane across said rack, a lever $Q^2$ pivoted to lever Q' on a pivot at right angles to that of lever Q', a second dog pivoted to said lever $Q^2$ and adapted to engage the rack alternately with the rigid dog, the pivot of the second dog being so located in relation to the pivot of $Q^2$ as to be slightly moved away from the feed-rack when lever $Q^2$ swings from its normal position to allow the carriage and rack to be pushed back, a yoke to limit movement of lever $Q^2$, and keys and levers adapted to operate lever Q', substantially as set forth.

43. In a type-writer, the mechanism for giving the rotary feed to the platen, consisting of the platen, a ratchet secured to the end of the same, a pawl engaging with said ratchet and pinioned to an arm journaled on the end of the platen, a push-lever fulcrumed to the carriage-frame, operating in the same direction as the return longitudinal movement of the carriage, and one of its arms loosely connected with the pawl, and a spring tending to bear up said arm and pawl, all as set forth.

44. In a type-writer, the combination of the rotary platen, a ratchet secured to the end of the same, an arm pivoted on the end of the platen, a pawl pivoted to said arm and adapted to engage with said ratchet, a friction-washer bearing against said arm, a rock-arm loosely engaging with the pawl, and a spring tending to bear said rock-arm and pawl away from the ratchet, whereby the movement of the rock-arm will first move the pawl into engagement with the ratchet and next move the pawl with its friction-arm support and rotate the platen, all as set forth.

45. In a type-writer, the combination of the rotary platen, a ratchet secured to the end of the same, a pawl engaging with said ratchet and pinioned to an arm journaled to the end of the platen, a spring push-lever fulcrumed to the carriage-frame, operating in the same direction as the return longitudinal movement of the carriage, one of its arms loosely connected with the pawl, and another arm spanning an adjusting-screw for limiting the movement of the lever, all as set forth.

46. In a type-writer, the combination of the rotary platen, a ratchet secured to the end of the same, a pawl engaging with said ratchet, a rock-arm journaled to the end of the platen, and to which the pawl is pivoted, a stop for limiting the movement of the arm in a direction away from the pawl, a spring push-lever fulcrumed to the carriage-frame, operating in the same direction as the return longitudinal movement of the carriage, and one of its arms loosely connected with the pawl, all as set forth.

Signed at New York, in the county and State of New York, this 10th day of February, 1898.

JOHN PRATT.

Witnesses:
J. S. M. BOWEN,
C. HOLLOWAY.